July 29, 1947.  F. J. GROVEN ET AL  2,424,816
APPARATUS FOR INDUCTION HEATING OF GEARS AND LIKE OBJECTS
Filed June 16, 1943  2 Sheets-Sheet 1

F. J. Groven
W. F. Pioch
INVENTOR.

BY Edwin C. McRae
R. G. Harris
Attorneys.

July 29, 1947. F. J. GROVEN ET AL 2,424,816
APPARATUS FOR INDUCTION HEATING OF GEARS AND LIKE OBJECTS
Filed June 16, 1943 2 Sheets-Sheet 2

F. J. Groven
W. F. Pioch
INVENTOR.

BY *Edwin C. McRae*
*R. G. Jarvis*
Attorneys.

Patented July 29, 1947

2,424,816

UNITED STATES PATENT OFFICE 2,424,816

APPARATUS FOR INDUCTION HEATING OF GEARS AND LIKE OBJECTS

Fredrick J. Groven, Highland Park, and William F. Pioch, Detroit, Mich., assignors to Ford Motor Company, Dearborn, Mich., a corporation of Delaware Application June 16, 1943, Serial No. 490,970

6 Claims. (Cl. 219—13)

This invention relates to a method and apparatus for the inductive heating of metallic objects having intermittent extending portions; and, more particularly such objects as sprocket wheels, gears and the like.

The purpose of this invention is to devise an induction heating device in which metal objects having intermittent extended portions, such as the teeth found on sprocket wheels and gears, may be subjected to localized heating in carefully established zones. Another purpose is to devise an induction heating machine in which all of the teeth of these objects may be heated simultaneously and in which the heating effect can be made uniform for each tooth. Another purpose of the invention is to devise a production type of induction heating apparatus in which such objects may be positioned rapidly and the induced currents applied simultaneously and automatically to all of the teeth of the object, thereby reducing the time required for treatment to a minimum.

An advantage of the present device is that it permits the equalized and localized heat-treatment of all of the teeth of a sprocket wheel or gear simultaneously and equally. Another advantage is that in a machine constructed as shown there are no delays incident to loading or unloading, nor is any manipulation required as when the teeth are treated consecutively as heretofore. Another advantage of the present invention is that the means by which the heating effect is localized are automatically movable to positions of engagement and disengagement with the object to be treated so that the placing or removing of the work can be carried out expeditiously. Another advantage of the present device is that the principal electrical circuit itself is entirely stationary and only movement of the flux directing means which are not directly connected with the current source is required.

The machine shown finds particular application in heat-treatment of devices such as sprocket wheels and gears in which differentiation of heat-treatment between the tooth and the body is particularly desirable. While some machines have been devised, in which one or several of the teeth are treated successively, this is not desirable because the varying treatment is accorded the metal adjacent the roots of successive tooth groups. The only way in which absolute uniformity of treatment is assured is to have the treatment carried on simultaneously but in the mechanism hitherto available, this required extremely complicated apparatus and could not be carried out successfully as a production operation.

With these and other objects in view, the invention consists in the arrangement, construction and combination of the various parts of the improved device, described in the specification, claimed in the claims and illustrated in the accompanying drawings in which:

Figure 1:
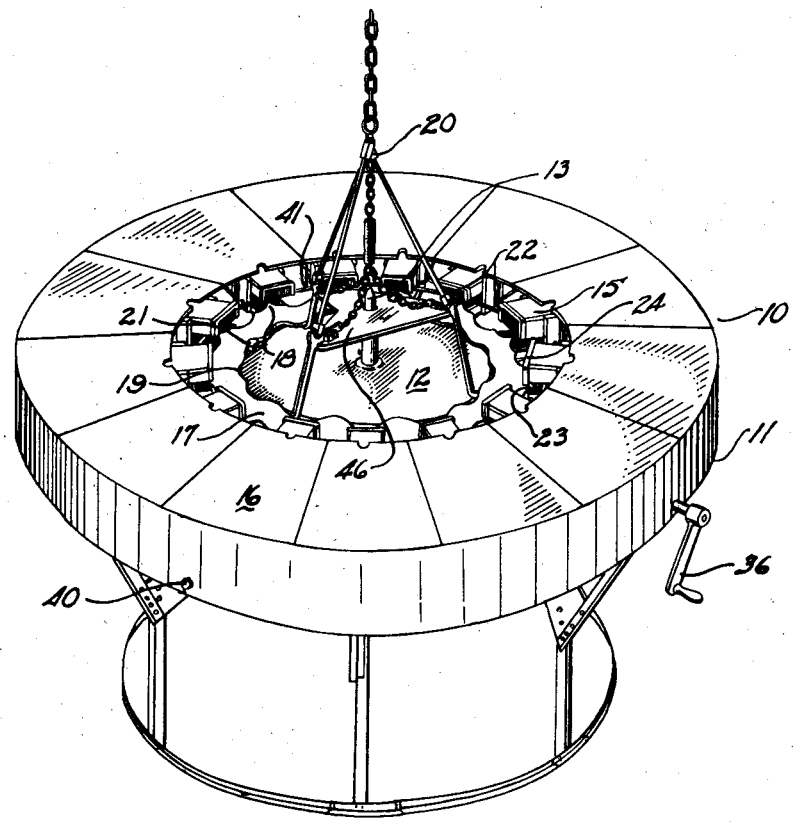
Fig. 1 is a perspective view of the induction heating machine.
Figure 2:
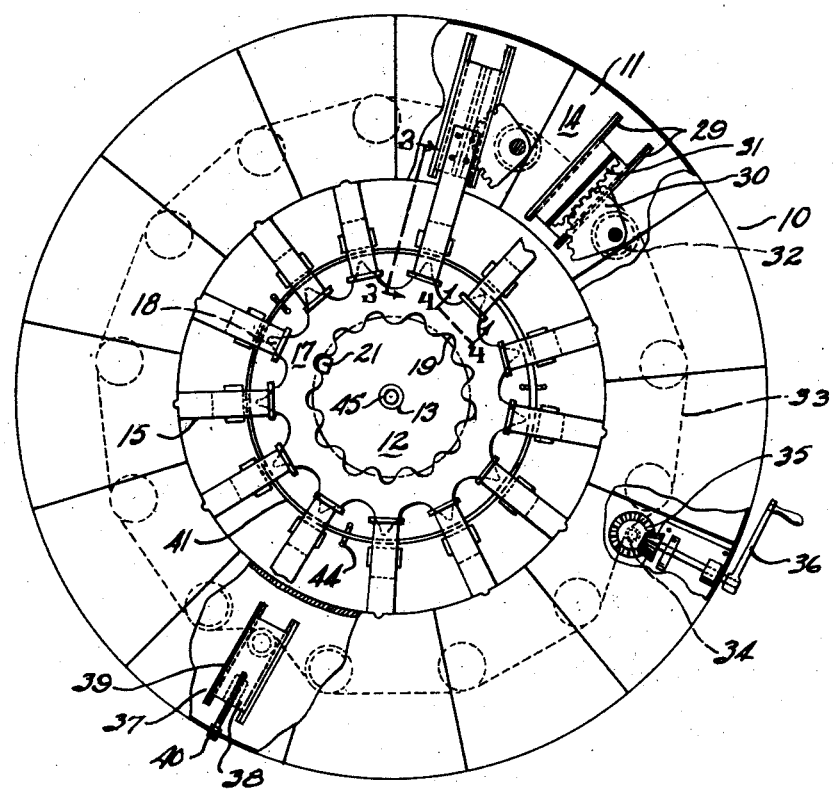
Fig. 2 is a plan view of the machine, portions of the covering being broken away to show the interior mechanism.

Referring to Figs. 1 and 2, the machine is indicated generally at 10 and includes a table 11 having a raised central portion 12, a spindle 13 and a lower circumferential portion 14 on which are mounted the heating or flux concentrating units 15 protected by the sectional covering 16. The work 17, as indicated, is a sprocket wheel having teeth 18 and inner indentations 19 and is engaged by the self-setting tackle 20 which is piloted on a spindle 13. The work 17 is lowered into position on the central portion 12 of the table and fixed in position thereon by the lugs 21. The spindle has differential diameters forming a shelf which co-operates with the plate 46 of the tackle 20 to operate it as the work is lowered to proper position.

Figure 3:
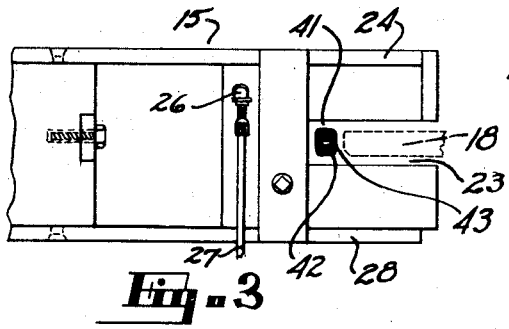
Fig. 3 is a side elevation of one of the flux directing means taken on the line 3—3 of Fig. 2.
Figure 4:
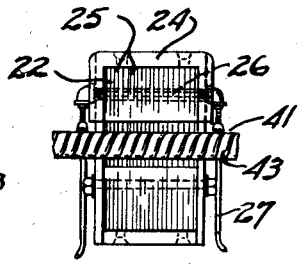
Fig. 4 is an end view of one of the flux directing means taken as indicated by the line 4—4 of Fig. 2.

As best seen in Fig. 2, an individual heating or flux concentrating unit 15 is provided for each of the teeth 18 of the work. These units, shown in detail in Figs. 3 and 4, are reciprocably mounted on the circumferential portion 14 of the table. Each unit includes a core 22 having an inwardly directed throat 23 secured in a casing 24. The core, as is customary, is made up of a number of individual laminae 25 and is traversed by a cooling pipe 26 which communicates through flexible tube 27 with a fluid coolant source not shown. The bottom plate 28 of the casing 24 rests in the gibs 29, which are secured on the table section 14 so that the core and casing as a unit may be advanced or retracted. This is accomplished through the sector gears 30 pivoted on the section 14 of the table engaging a rack 31 on the bottom of each heating unit. Attached to the sector gear 30 and located beneath the table is a chain sprocket 32 which is driven by the continuous chain 33 which, in turn, is operated by the chain pinion 34 associated with the bevel gearing 35 operated by the hand crank 36. Alternatively, a motor drive means may be provided with automatic control in the larger machines or in those in which time of operation is a particular factor. The chain take-up device 37 is provided, consisting of a carriage 38 mounted in gibs 39 and operated by screw 40 through which the chain 33 may be tensioned.

The induction coil 41 is preferably in the form of a number of turns of flat copper tubing 42 covered with suitable insulating material 43 and is rigidly supported by brackets 44 on the table 11. This coil is connected in the usual manner with an alternating current source and provided with the conventional fluid-cooling circuit, neither of these details being shown.

In operation the individual heating units are retracted from the position shown in Fig. 2 through the operation of the hand crank and its associated chain drive so that they clear the sprocket teeth indicated by the dotted lines. The sprocket wheel is then inserted, as shown in Fig. 1, and the tackle disengaged and removed. The units 15 are then advanced to the position shown in Fig. 2 and induction coil 41 is energized. The resultant flux is concentrated and localized through the agency of the separate cores and directed to precisely that portion of the sprocket tooth which is to be treated. By varying the size or shape of the core, it is possible to obtain different distributional characteristics with resultant variation in the treatment. The heating of each tooth, which may be observed visually, is remarkably uniform and suitable temperatures are reached in a matter of several minutes. The coil is de-energized and the heating units may be retracted, after which the sprocket may be quenched in situ by a spray-quenching apparatus (which is not shown) or by removal and immersion in a regular quenching tank.

One of the particular advantages of the machine shown is its adaptability in that the core segments are replaceable and hence cores of different design may be used to accommodate differently shaped teeth of the different types of work to be handled. Moreover, the heating unit gibs 29 are removably mounted on the table and may be shifted or their positions altered when it is desired to treat articles having a different number of teeth or different shape, with the addition of extra sector gears and chain sprockets. Similarly, the range of movement is readily controlled to heat large or small articles. The electrical circuit is immovably mounted thereby reducing contact difficulties and only the core members need be reciprocated; but by making them reciprocal, the speed with which the work may be handled is increased and it is possible to handle articles of the nature shown with ease and dispatch. Moreover, it is possible to adapt the same machine to the treatment of internally as well as externally toothed articles.

Some changes may be made in the arrangement, construction and combination of the various parts of the improved device without departing from the spirit of the invention, and it is the intention to cover by the claims such changes as may be reasonably included within the scope thereof.

The invention claimed is:

1. In an apparatus for the selective induction heating of separate circumferentially disposed portions of metal articles, a support for the article to be heated, a continuous induction coil arranged to lie circumferentially adjacent said separate portions of the work to be heated, and a plurality of individual flux concentrating means arranged to surround partially said coil and said separate portions to restrict the heating effect of said coil to said separate portions.

2. In an apparatus for the induction heating of selected portions of flat, relatively thin articles, a support for said article, a continuous flat induction coil mounted on said support substantially coplanar with and in a position to enclose circumferentially said article when located thereon and to be positioned immediately adjacent said selected portions, a plurality of individual flux intensifying means slidably mounted on said support, said means each comprising a core of a plurality of laminae having a throat formed therein adapted to receive at least a selected portion of said article, said induction heating coil being positioned in said throat, and means for the simultaneous reciprocation of said flux intensifying means.

3. In an apparatus for the induction heating of the teeth of gears, sprocket wheels and the like, comprising, a support for the articles to be heated therein, a continuous induction coil mounted on said support, and adjacent to the teeth of the articles to be heated therein, a plurality of individual flux intensifying means slidably mounted on said support and having a laminar core with a throat formed therein, said throat designed in one position of reciprocation to enclose a selected portion of a tooth of said article and in the other position of reciprocation to clear said article, said induction coil being located adjacent the rear of said throat in said first position of reciprocation, and means on said support selectively operable to reciprocate all of said flux intensifying means simultaneously.

4. The structure of claim 3 which is further characterized in that said last-named means includes an endless chain associated with gearing at each of said flux intensifying means.

5. In an apparatus for the induction heating of toothed articles such as sprocket wheels, gears and the like, in which the heating is to be confined to the teeth thereof, a support for the article to be heated, a continuous induction coil mounted on said support, the dimension sufficient to permit the mounting of said article so that the teeth are adjacent thereto, a plurality of individual flux intensifying means reciprocably mounted on said support, each of said flux intensifying means incorporating a laminar core having a throat formed therein, said throat enclosing said induction coil at any point of reciprocation of said means and adapted to enclose a tooth of the article to be heated in an extreme position of reciprocation, means mounted on said support and associated with each of said flux intensifying means for simultaneous reciprocation of said flux intensifying means, coolant passages in each of said flux intensifying means and flexible connection in said coolant passages to permit the cooling thereof in said various positions of reciprocation.

6. In an apparatus for the selective induction heating of separate projecting portions of metal articles, a support for the article to be heated, a continuous induction coil arranged to follow a line adjacent to the tips of the separate projections to be heated, and a plurality of individual flux concentrating means arranged to surround partially said induction coil and said tips of the separate projections to restrict the heating effect of said induction coil to said separate projecting portions.

FREDRICK J. GROVEN.
WILLIAM F. PIOCH.

REFERENCES CITED

The following references are of record in the file of this patent:

UNITED STATES PATENTS

| Number | Name | Date |
|---|---|---|
| 2,024,906 | Bennett | Dec. 17, 1935 |
| 2,080,400 | Fredrickson | May 18, 1937 |
| 2,188,569 | Endsley | Jan. 30, 1940 |
| 2,282,322 | Denneen et al. | May 12, 1942 |